United States Patent [19]
Green

[11] Patent Number: 5,899,178
[45] Date of Patent: *May 4, 1999

[54] LOW EMISSION POWER PLANT AND METHOD OF MAKING SAME

[75] Inventor: Edward Green, Bakersfield, Calif.

[73] Assignee: Clean Cam Technology Systems

[*] Notice: This patent is subject to a terminal disclaimer.

[21] Appl. No.: 09/030,659

[22] Filed: Feb. 25, 1998

Related U.S. Application Data

[63] Continuation of application No. 08/721,232, Sep. 26, 1996, Pat. No. 5,746,163.
[51] Int. Cl.$^6$ ..................................................... F02B 75/02
[52] U.S. Cl. ................................. 123/65 VC; 123/65 BA; 123/568.14
[58] Field of Search .......................... 123/65 VC, 65 BA, 123/568.14

*Primary Examiner*—Noah P. Kamen
*Attorney, Agent, or Firm*—James E. Brunton

[57] ABSTRACT

A low emission power generating apparatus which comprises a modified two-stroke diesel engine component and a modified turbocharger component which has a relatively low aspect ratio. The diesel engine component is a modification of a conventional two-stroke diesel engine design and includes an exhaust valve cam of unique design that has a cam profile which results in a later-than-normal exhaust valve opening and an earlier-than-normal valve closing so that the time during which the exhaust valve remains open is shorter than normal, thereby causing a substantially greater volume of residual gases to remain in the combustion chamber following the scavenge stroke. This increase in the volume of the residual exhaust gases within the chamber leads to an increase in compression temperature and effectively increases the compression ratio and consequently the compression pressure. Because of the heat absorption capacity of these residual exhaust gases, the exhaust gases remaining in the chamber following the scavenge stroke tend to absorb combustion heat and thereby effectively reduce the peak combustion temperature. This reduction in peak combustion temperature advantageously results in the lower than normal production of nitrogen oxide (NOx) and, therefore, allows advancement of the injection timing, while still maintaining the NOx emissions coming from the engine lower than those legislatively mandated.

12 Claims, 6 Drawing Sheets

LOW EMISSION POWER PLANT AND METHOD OF MAKING SAME

BACKGROUND OF THE INVENTION

This is a Continuation Application of application Ser. No. 08/721,232 filed Sep. 26, 1996, now U.S. Pat. No. 5,746,163.

FIELD OF THE INVENTION

The present invention relates generally to mechanical power plants. More particularly, the invention concerns a low emission power plant which comprises a modified diesel engine component and a modified turbocharger component which has a relatively low turbocharger aspect ratio. The diesel engine component is a modification of a two-stroke, uniflow-scavenge diesel engine design and includes an exhaust valve cam of unique design that has a cam profile which results in a later-than-normal exhaust valve opening and an earlier-than-normal valve closing so that the time during which the exhaust valve remains open is shorter than normal thereby causing a substantially greater volume of residual gases to remain in the combustion chamber following the scavenge stroke.

DISCUSSION OF THE PRIOR ART

Mechanical power plants embodying diesel engines are widely used in both on-road and off-road applications. Such power plants have always been popular for use in large trucks. However, such power plants have also been used extensively for off-road applications such as in earth moving equipment, in road graders and in stationary applications in connection with water and oil well drilling and pumping apparatus and many other applications.

Diesel engines are designed to operate on the two-stroke or on the four-stroke principle as are gasoline engines. In the two-stroke engine, intake and exhaust take place during part of the compression. A four-stroke engine requires four piston strokes to complete an operating cycle and thus, during one-half of its operation, the four-cycle engine functions merely as an air pump. The present invention is directed primarily, but not exclusively, to use with two-stroke engines.

While diesel engines are durable, reliable, and economical, the control of emissions from such engines has presented substantial problems. Accordingly, extensive research has been directed toward making the diesel engine burn ever cleaner so as to meet seemingly ever increasing emission control requirements imposed by state and federal legislation. In this regard, substantial experimentation has been in the areas of electrical and electronics monitoring and control. However, the thrust of the present invention is directed to effectively decreasing emissions from diesel engine power plants by mechanical means using, for the most part specially modified, generally commercially available components.

As will be better appreciated from the discussion which follows, emissions from the improved mechanical power plant of the present invention are quite low. For example, the current legislatively mandated levels of hydrocarbon emissions require that hydrocarbon emissions be no greater than 1.3 grams per horsepower-hour (g/bhp-hr.). Testing of the novel apparatus of the present invention by an independent testing agency has shown the hydrocarbon emissions to be on the order of 0.54 g/bhp-hr, which is obviously substantially less than the generally accepted regulatory level. Similarly, the applicable legislatively mandated limit for particulate emissions is set at 0.1 grams per brake horsepower-hour (g/bhp-hr.). When the apparatus of the present invention was appropriately coupled with a catalytic converter of conventional design and was applied to a typical two-stroke engine, testing of the assemblage revealed that particulate emissions were on the order of 0.08 g/bhp-hr,. which is well within the limits imposed by the retrofit standard. Additionally, while the mandated limit for carbon monoxide emissions is 15.5 g/bhp-hr. testing of the apparatus of the present invention shows carbon monoxide emissions from the apparatus to be less than 0.6 g/bhp-hr. Finally, testing of the power plant of the invention has also revealed that during normal operation the NOx emissions from the power source were 10.2 g/bhp-hr, which is comfortably lower than the legislatively mandated level of 10.7 g/bhp-hr.

SUMMARY OF THE INVENTION

As previously mentioned, the thrust of the present invention is directed toward achieving a substantial reduction in harmful exhaust emissions from diesel engines by mechanical rather than electrical or electronic means and, for the most part, involves the use of specially modified conventional components. In this regard, one form of the improved power plant of the present invention comprises a modification of a power plant which is commercially available from the Detroit Diesel Corporation and includes both a specially modified diesel engine component and a specially modified turbocharger component.

By way of brief summary, the invention involves a two prong approach to the effective reduction of harmful exhaust emissions from conventional diesel engines. The first prong of the approach involves the strategic redesign of both the exhaust cam profile of the conventional uniflow-scavenged, two-stroke diesel engine component and of the cylinder liner configuration thereof in a manner to cause an increase in the volume of residual exhaust gases that remain in the cylinder during the compression, combustion and power strokes. This increase in the volume of the residual exhaust gases within the cylinder leads to an increase in compression temperature and effectively increases the compression ratio and consequently the compression pressure. Because of the heat absorption capacity of these residual exhaust gases, the exhaust gases remaining in the cylinder, following the scavenge stroke, tend to absorb combustion heat and thereby effectively reduce the peak combustion temperature. This reduction in peak combustion temperature advantageously results in the lower than normal production of nitrogen oxide (NOx) and, therefore, allows advancement of the injection timing, while still maintaining the NOx emissions coming from the engine lower than those legislatively mandated. Advantageously, the advance in injection timing, which increases NOx emissions will, in accordance with the well understood NOx versus particulate matter tradeoffs, also have the effect of reducing particulate matter emissions. Thus, by increasing the volume of residual exhaust gases within the cylinder, significant particulate matter emission reductions can be achieved, while at the same time maintaining NOx emissions well below acceptable levels.

The second prong of the inventive approach involves modification cation of the turbocharger component of the apparatus in a manner to provide additional oxygen to the combustion process. The provision of additional oxygen to the heated combustion chamber of the engine accelerates the oxidation of the soluble organic fraction contained within the chamber which is a major component of the undesirable particulate matter emissions. More specifically, the additional charge of oxygen-rich air into the combustion chamber effectively increases the compression pressure, which in turn, leads to an earlier start of combustion because of the combustible mixture reaching its auto ignition temperature at an earlier point in time. This phenomenon leads to more thorough combustion of the fuel and also generally leads to higher exhaust temperatures. Higher exhaust temperatures, in turn, lead to a greater oxidation rate of the soluble organic fraction thus further lowering the level of undesirable particulate matter emission from the engine.

With the foregoing discussion in mind, it is an object of the present invention to provide a mechanical power plant and the method of making the same for use both in on-road and off-road applications, in which the exhaust emissions from the modified diesel engine component of the apparatus are substantially reduced.

Another object of the invention is to provide a mechanical power plant of the aforementioned character which includes a specially modified, conventional two-stroke uniflow-scavenged diesel engine that has a lower than normal exhaust valve lift and a shorter than normal exhaust valve open time, thereby effectively increasing the amount of residual exhaust gases remaining in the combustion chamber following the scavenge stroke.

Another object of the invention is to provide a mechanical power plant as described in the preceding paragraphs which provides for a greater than normal flow of oxygen-rich air into the combustion chamber of the modified diesel engine so as to accomplish more complete and efficient combustion of fuel and, at the same time, accelerate the oxidation of the soluble organic fraction, that is the unburned lubricating oil and fuel fraction formed in the exhaust system and trapped on the particulate emission sampling filter.

Another object of the invention is to provide a unique mechanical power plant in which the nitrogen oxide emissions exhausted from the diesel engine component are effectively maintained at levels below those set by the air quality regulatory agencies.

These and other objects of the invention are achieved by the novel power generating apparatus of the invention, one form of which is more fully described in the paragraphs which follow.

DESCRIPTION OF THE INVENTION

Referring to the drawings and particularly to FIGS. 1, 2A, 2B, and 2C, a mechanical power plant of the general character of the apparatus of the present invention is diagrammatically illustrated. These figures are general in character and do not show all of the various standard components of the power plant, which components are well known to those skilled in the art. As previously mentioned, one form of the power plant of the invention comprises a modification of a commercially available power plant which is also of a character well known to those skilled in the art and includes a turbocharger component and a diesel engine component. In a manner presently to be described, the turbocharger component along with a blower unit functions to controllably deliver air under pressure to the inlet ports of the combustion chamber of the diesel engine component. The diesel engine component of the conventional power plant has a combustion cycle and a scavenge stroke and includes one or more valves for opening and closing exhaust ports provided in the combustion chamber. Additionally, the diesel engine component has a camshaft for operating the valve, a fuel injector for injecting fuel into the combustion chamber, and an injection timing control means which typically comprises a cam profile and a set of shims for timing the injection of fuel into the combustion chamber.

Figure 1:
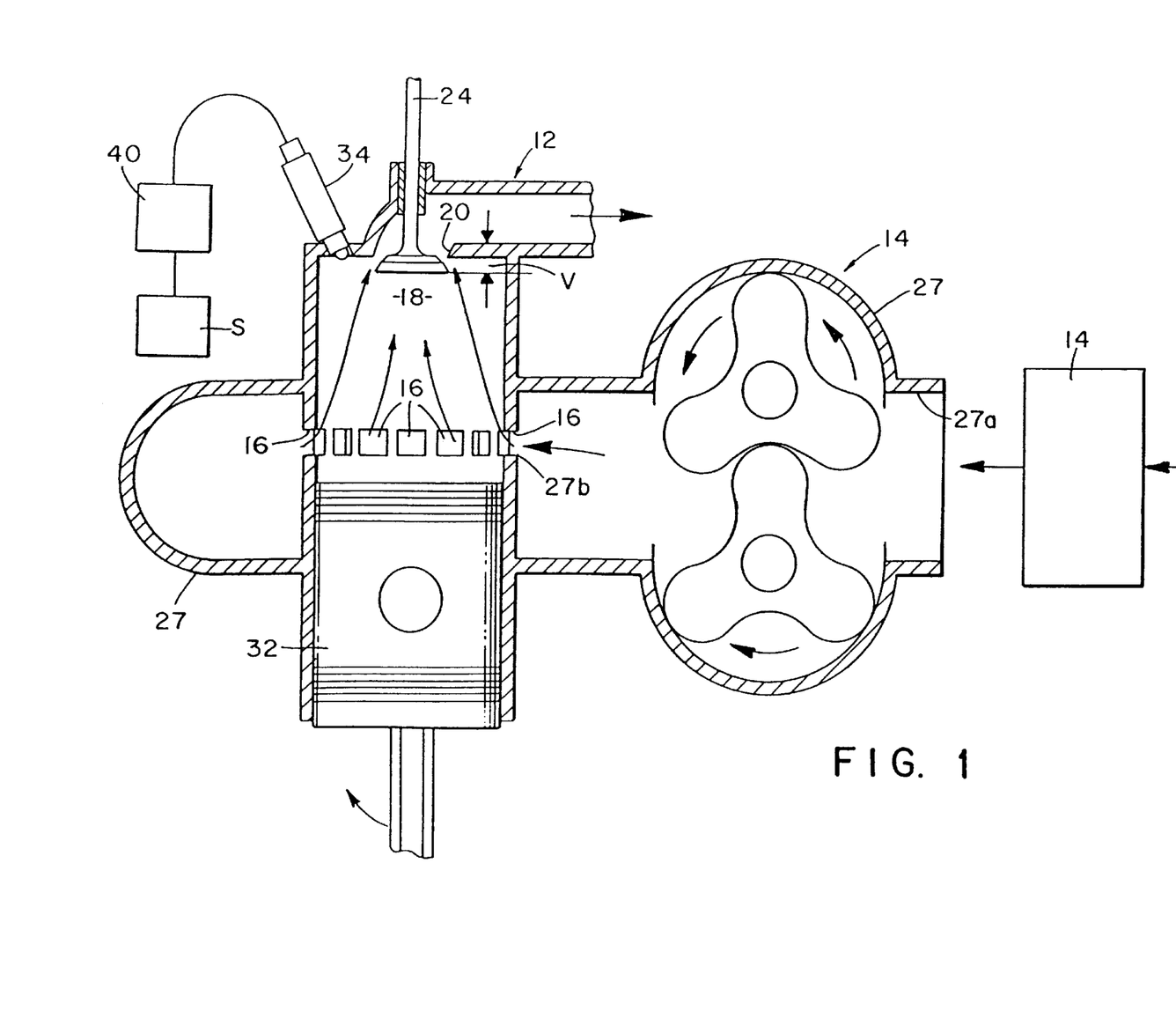
FIG. 1 is a generally diagrammatic view of one form of the power plant or power generating apparatus of the invention illustrating the scavenge stroke of the diesel engine component of the apparatus

As best seen in FIG. 1, the power plant of the invention basically comprises a modification of a conventional power plant and includes a two-stroke diesel engine component, generally designated by the numeral 12, and a turbocharger means shown in FIG. 1 as comprising a conventional blower 27 and a turbocharger component 14. turbocharger component 14 receives fresh air from atmosphere, raises its pressure and delivers it to the inlet ports 16 of the diesel engine component typically via blower 27. The air under pressure is then delivered to a combustion chamber 18, which is provided with an exhaust port 20. Exhaust port 20 is opened and closed by valve means shown here as comprising a valve member 24. It is to be understood that the engine typically includes more than one valve but, for simplicity of explanation, only one exhaust valve is shown in the drawings and described herein. The blower 27 of the turbocharger means includes an air inlet 27a and a compressed air discharge outlet 27b.

Air discharge outlet 27b of blower 27 communicates with the combustion chamber 18 of the diesel engine component via the plurality of circumferentially spaced inlet ports 16. In one form of the diesel engine component of the present invention, the inlet ports are provided in a cylinder liner 30 which is of the general configuration shown in FIG. 3. As is well understood by those skilled in the art, liner 30, is receivable within a counter bore formed in the cylinder block of the diesel engine component (not shown in FIG. 1) and includes a plurality of circumferentially spaced apart air inlet ports 16a which are positioned within the engine to receive fresh air from the discharge outlet 27b of the blower 27 of the turbocharger means so that the air will flow into the combustion chamber (see FIG. 3).

With the foregoing general description of the diesel engine component of the invention in mind and by way of general background discussion, the diesel engine itself basically comprises an internal combustion power plant in which the heat of fuel is converted to work in the cylinder of the engine. In operation, air is compressed in the cylinder and then fuel is injected into the cylinder via fuel injection means. Ignition of the fuel is accomplished by the heat of compression.

Figure 2A:
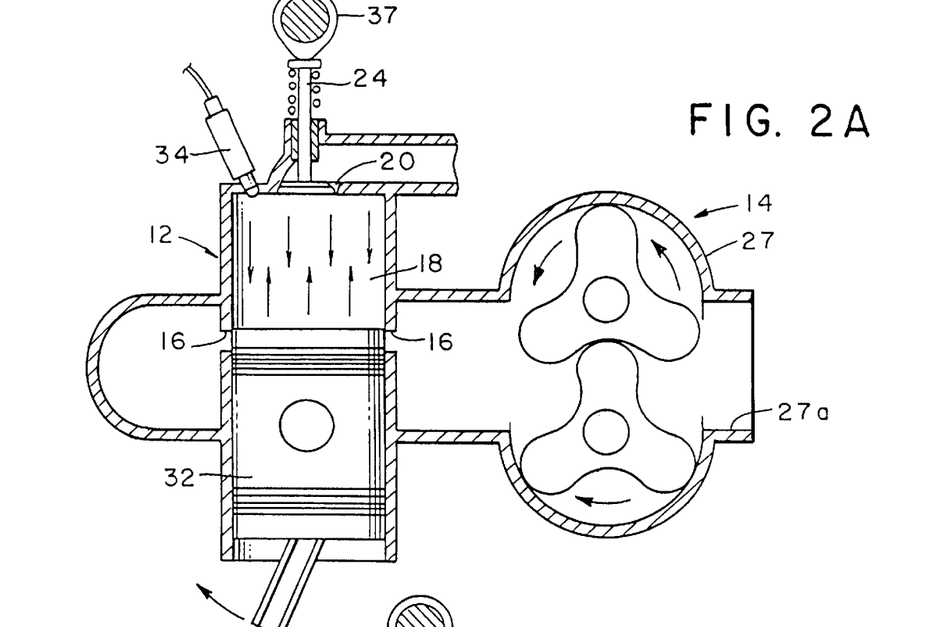
FIG. 2A is a generally diagrammatic view illustrating the compression stroke of the diesel engine component.
Figure 2B:
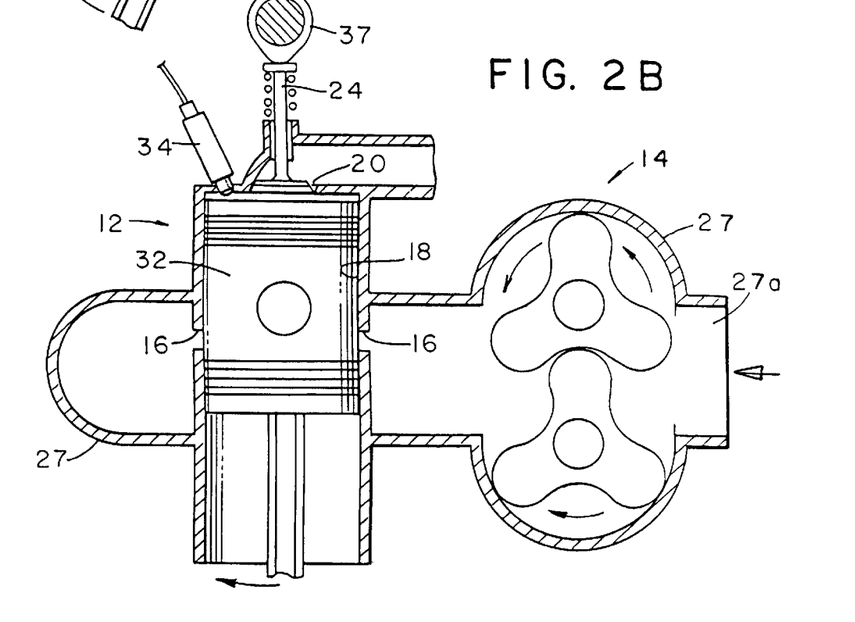
FIG. 2B is a generally diagrammatic view illustrating the power stroke of the diesel engine component.
Figures 2C, 3:
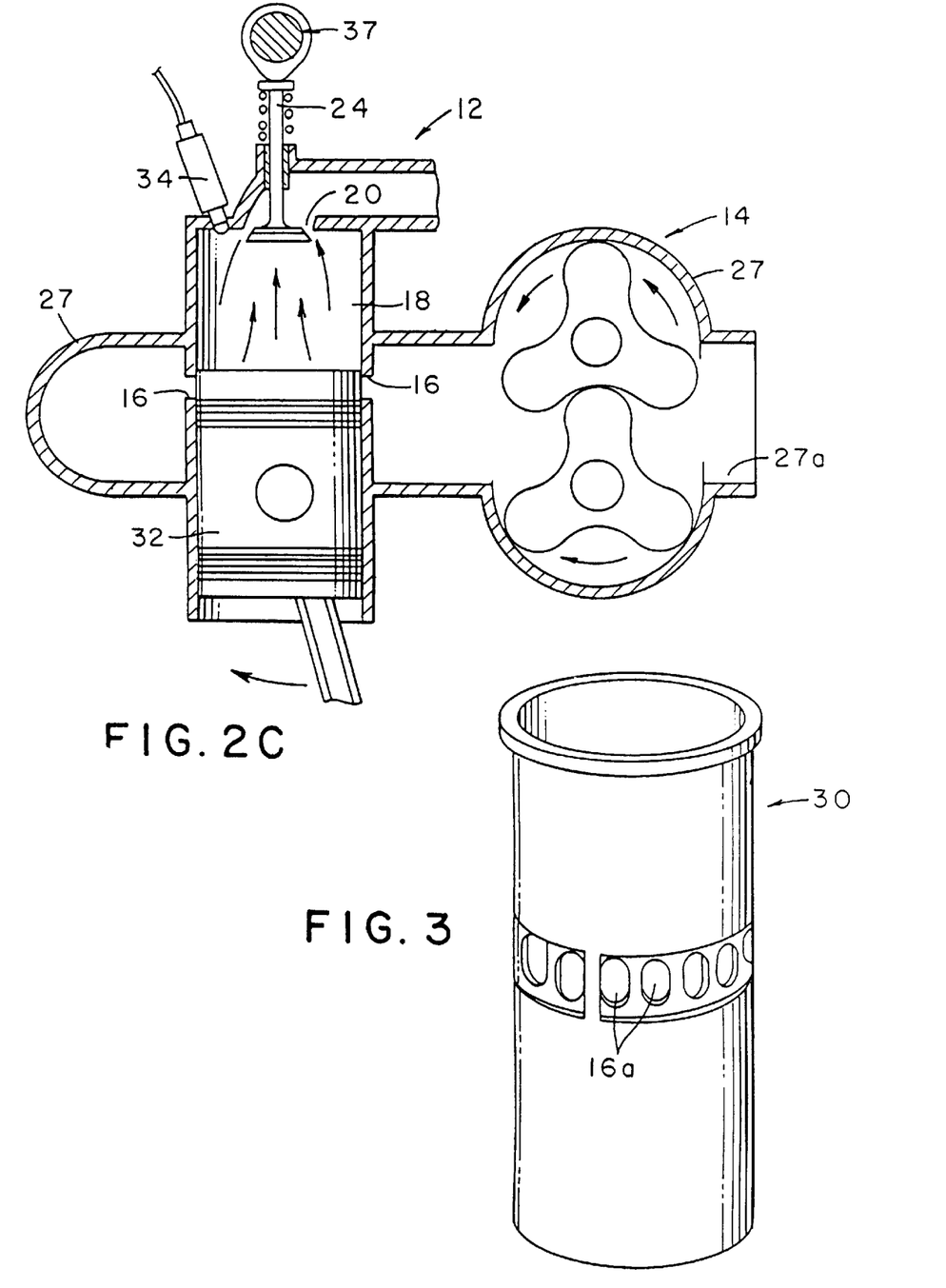
FIG. 2C is a generally diagrammatic view illustrating the exhaust stroke of the diesel engine component.
FIG. 3 is a generally perspective view of one form of modified cylinder liner of the diesel engine component.

As illustrated in FIGS. 2A through 2C of the drawings, in the typical two-stroke engine, intake and exhaust take place during the compression and power strokes respectively (FIGS. 2B and 2C).

As a general rule, two-stroke diesel engines are produced in 3, 4 and 6 cylinder models, each of which typically has the same bore and stroke and many of the same working parts such as pistons, connecting rods, cylinder liners and the like. In addition to turbocharger means, the typical two-stroke diesel engine component includes standard accessories, which are not shown in the drawings but, which are well understood by those skilled in the art, such as a water pump, a fuel pump, a fuel filter, an oil cooler, a heat exchanger, a water pump, a radiator and a starting motor. Additionally, pressure lubrication is typically supplied to all main connecting rods and to the various moving parts of the engine.

Turning once again to FIG. 1, in engine operation the unidirectional flow of air in the direction of the arrows of FIG. 1 produces a scavenging effect. In the conventional two-stroke diesel engine component, this scavenging stroke leaves the cylinder substantially full of clean air at the time at which the piston moves to a position where it covers the inlet ports. However, for reasons presently to be discussed, the diesel engine component of the present invention is uniquely modified to deviate from this standard approach and, accordingly, includes a modified scavenge stroke which leaves a substantial volume of exhaust gases in the combustion chamber as the piston moves into the position shown in FIG. 2A.

Referring particularly to FIG. 2A, it is to be observed that continued upward movement of the piston 32 will tend to compress the exhaust gases remaining in the cylinder. At a point in time just prior to the piston reaching its highest position, fuel is injected into the combustion chamber by the fuel injector means, which includes a fuel injector of the general character shown in FIG. 1 and identified by the numeral 34. Injector 34 is generally commercially available and its construction and operation is well known to those skilled in the art. As the fuel is introduced into the combustion chamber, the intense heat generated during the compression cycle ignites the fuel to initiate the power stroke.

The pressure generated by the igniting, combusting and releasing the energy of the fuel forces piston 32 downwardly on its power stroke. As seen in FIG. 2C, when the piston is about half way down, exhaust valve 24 opens to permit the burned gases to escape through exhaust port 20. Shortly thereafter the downwardly moving piston 32 clears inlet ports 16 permitting scavenging air to once again be forced into the cylinder by the blower unit (see FIG. 1).

As previously mentioned, the diesel engine component of the power plant of the present invention basically comprises a modification of a conventional two-stroke, commercially available diesel engine. In fact, in one form of the invention, the diesel engine component, comprises a modification of a diesel engine sold by the Detroit Diesel Corporation under the model designation 6V92. The term "conventional engine" as used herein means a standard commercially available diesel engine of the general character exemplified by the 6V92 engine manufactured and sold by the Detroit Diesel Corporation. As will become clear from the discussion which follows, many of the features of the diesel engine component of the apparatus of the present invention (The Green Engine) are described in terms of changes to the commercially available Detroit Diesel engine. For example, the exhaust cam profile of the Detroit Diesel engine is specifically defined in Table 1 of the specification (see page 10A). While the exhaust cam profile of the diesel engine component of the present invention is specifically defined in Table 2 (see page 10B). Similarly, a comparison between the duration of time during which the exhaust valves are open in the diesel engine component of the present invention and in the Detroit Diesel engine are depicted in FIG. 4 of the drawings.

Perhaps the most astounding difference between the diesel engine component of the present invention (The Green Engine) and that of the conventional engine relates to the marked reduction in harmful exhaust emissions produced by the Green engine. For example, certain of these differences which have been quantified by an independent testing agency, are set forth in the following table wherein the various emissions are identified in terms of grams per base horsepower-hour:

| Engine | Carbon Monoxide | Emissions in g/bhp-hr | | |
| --- | --- | --- | --- | --- |
| | | Hydrocarbons | Particulates | NOx |
| Conventional engine | 1.1 | 0.7 | 0.56 | 9.5 |
| Green Engine | 0.9 | 0.5 | 0.13 | 10.6 |
| Green Engine + Catalyst | 0.5 | 0.3 | 0.08 | 10.2 |
| Standards | 15.5 | 1.3 | 0.1 | 10.7 |

Figure 4:
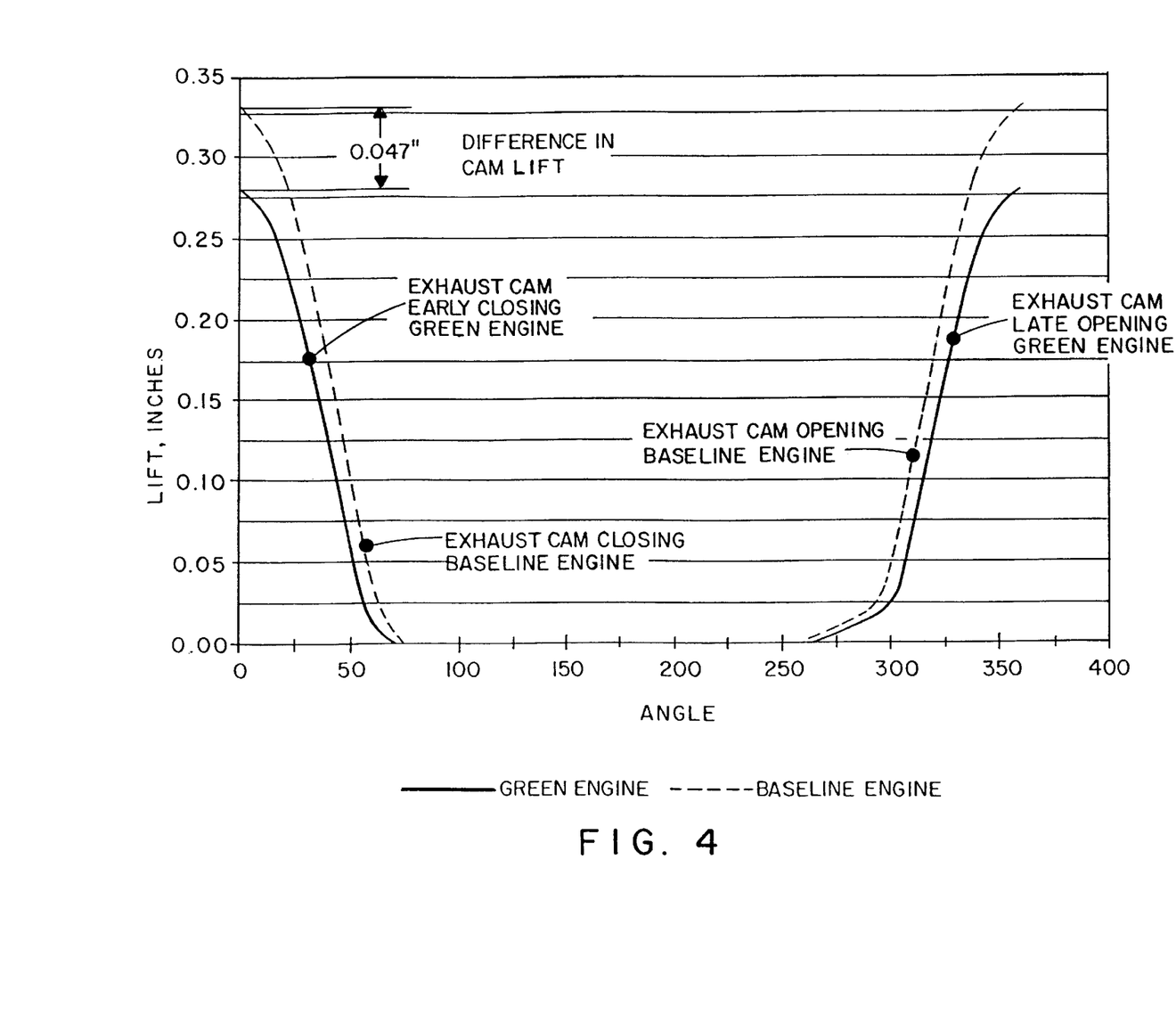
FIG. 4 is a graphical representation illustrating the difference in cam lift timing and cam profile between the diesel engine component of the present invention and the conventional diesel engine component manufactured and sold by the Detroit Diesel Corporation.
Figure 6:
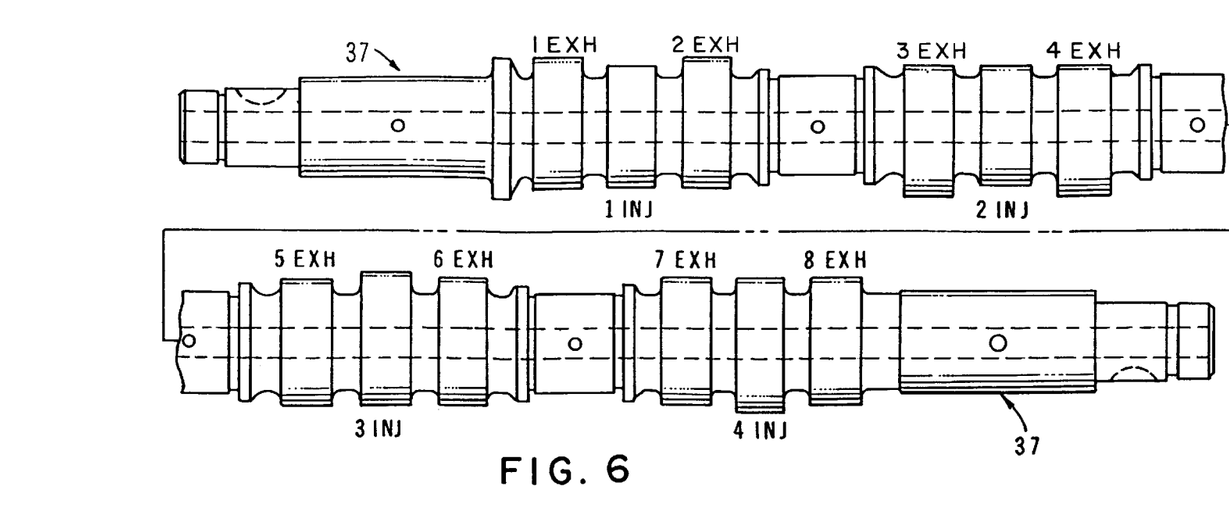
FIG. 6 is a side-elevational view of one form of modified camshaft usable with the diesel engine component of the power plant of the invention.
Figure 7:
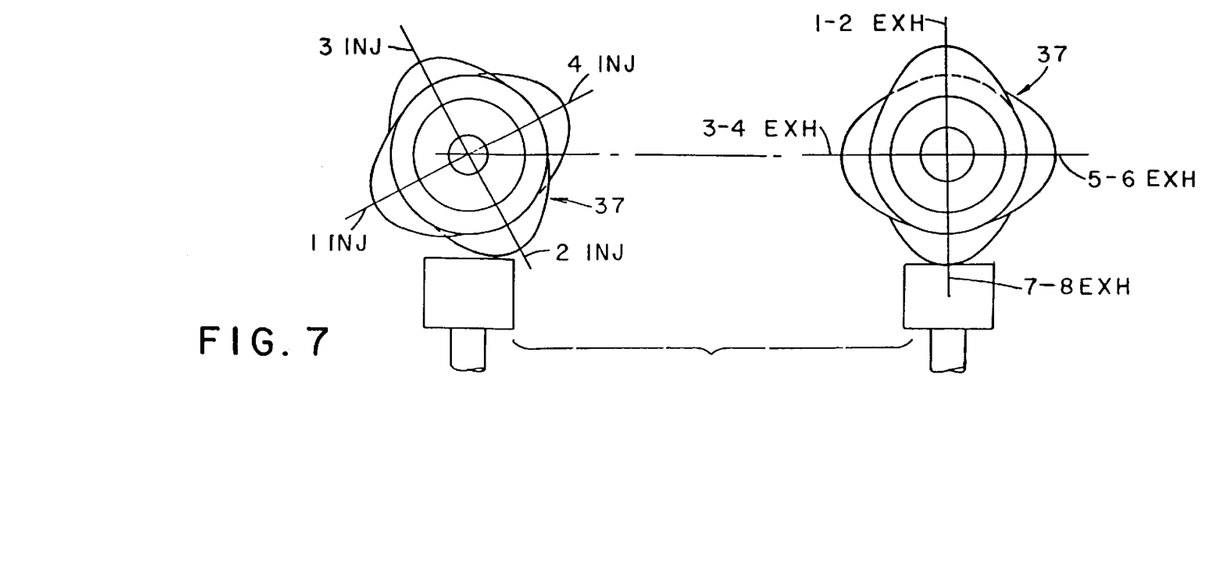
FIG. 7 is a diagrammatic view illustrating the operational sequence of the camshaft shown in FIG. 6.

With the foregoing considerations in mind, the specific aspects of the improved power plant of the present invention will now be addressed. One extremely important aspect of the invention involves a strategic modification of the exhaust valve cam profile of the diesel engine component. The nature and extent of this modification can be understood by a study of Tables 1 and 2 which define in detail the conventional engine cam profile (Table 1) and the modified or Green Engine cam profile (Table 2). Additionally, reference should be made to FIGS. 2C, 6 and 7 which diagrammatically show one form of camshaft 37 of the invention and illustrate its operational sequence. Basically this modification in cam profile results in the late or more retarded opening of the exhaust valve 24 and the early, or more advanced closing of the exhaust valve (see FIG. 4). As is also noted in FIG. 4, which plots valve lift against crank angle, this change in cam profile causes a net reduction of valve lift "V" of 0.047 inch, that is from about 0.327 inch in the conventional engine to about 0.280 inch in the modified engine (see also FIG. 1). The reduction in valve lift along with the reduction the overall duration of time during which the exhaust valve remains open, as depicted in FIG. 4, causes more residual gases to remain within the cylinder following the scavenge process depicted in FIG. 1. These residual gases, which remain trapped in the cylinder, have a substantial heat absorption capacity that tends to cause a reduction in the peak combustion temperature of the engine. The precise extent of this reduction in temperature in a particular engine, of course, depends on the volume of residual gases remaining in the cylinder, the specific heat of these gases at constant pressure and the difference between the temperature of combustion and the temperature of the residual gases.

The present inventor has discovered that the lowered peak combustion temperature achieved through trapping the residual gases within the combustion chamber results in the production of lower nitrogen oxide emissions (NOx) which, in turn, advantageously permits and advance in injection timing while still maintaining NOx emissions that still meet the retrofit rebuild standards. Accordingly, by advancing the injection timing, while at the same time increasing the flow of fresh air into the cylinder through use of a modified turbocharger having a smaller aspect ratio than found in conventional engine component, substantial reductions in particulate matter emissions were achieved. More particularly, in accordance with one form of the method of the present invention, by reducing the turbocharger aspect ratio from about 1.39 to about 1.08 and by strategically advancing the injection timing, which tends to increase the production of NOx, the production of particulate matter is markedly reduced. This result occurs because of the well known trade-off relationship between NOx and production of particulate matter which relationship is graphically illustrated in FIG. 5, which plots particulate emissions against NOx emissions as a function of injection timing. Further, reducing the turbocharger aspect ratio of the turbocharger component causes additional fresh air and therefore additional oxygen to be forced into the combustion chamber. As previously mentioned, this availability of increased oxygen at elevated combustion temperatures leads to a substantial increase in the rate of oxidation of the soluble organic fraction (SOF) which is a major component of particulate matter emissions especially in two-stroke diesel engines. The added charge of air provided by the modified turbocharger component also effectively increases the compression pressure which, in turn, leads to an earlier commencement of combustion because of the combustible mixture reaching its auto ignition temperature at an earlier point in the cycle. This latter phenomenon leads to a more thorough combustion of the fuel and also results in higher exhaust temperature, which, in turn, results in a greater rate of oxidation of SOF and accordingly less particulate matter in the exhaust emissions. To accommodate the increase in compression pressure, piston 32 comprises a modified piston having a compression ratio of about 15:1 as compared with a more conventional piston which has a compression ratio of 17:1.

Referring once again to FIG. 1, associated with the modified fuel injector 34, is a modified injection timing control means which may take the form of a modulator 40. Modulator 40 is operably interconnected with a source of fuel "S" and functions to proportionally introduce the fuel into the combustion chamber according to the level of boost pressure. Modulator 40 is of a character well known to those skilled in the art and can readily be adjusted in the manner presently to be discussed to accomplish the operational results desired.

Figure 5:
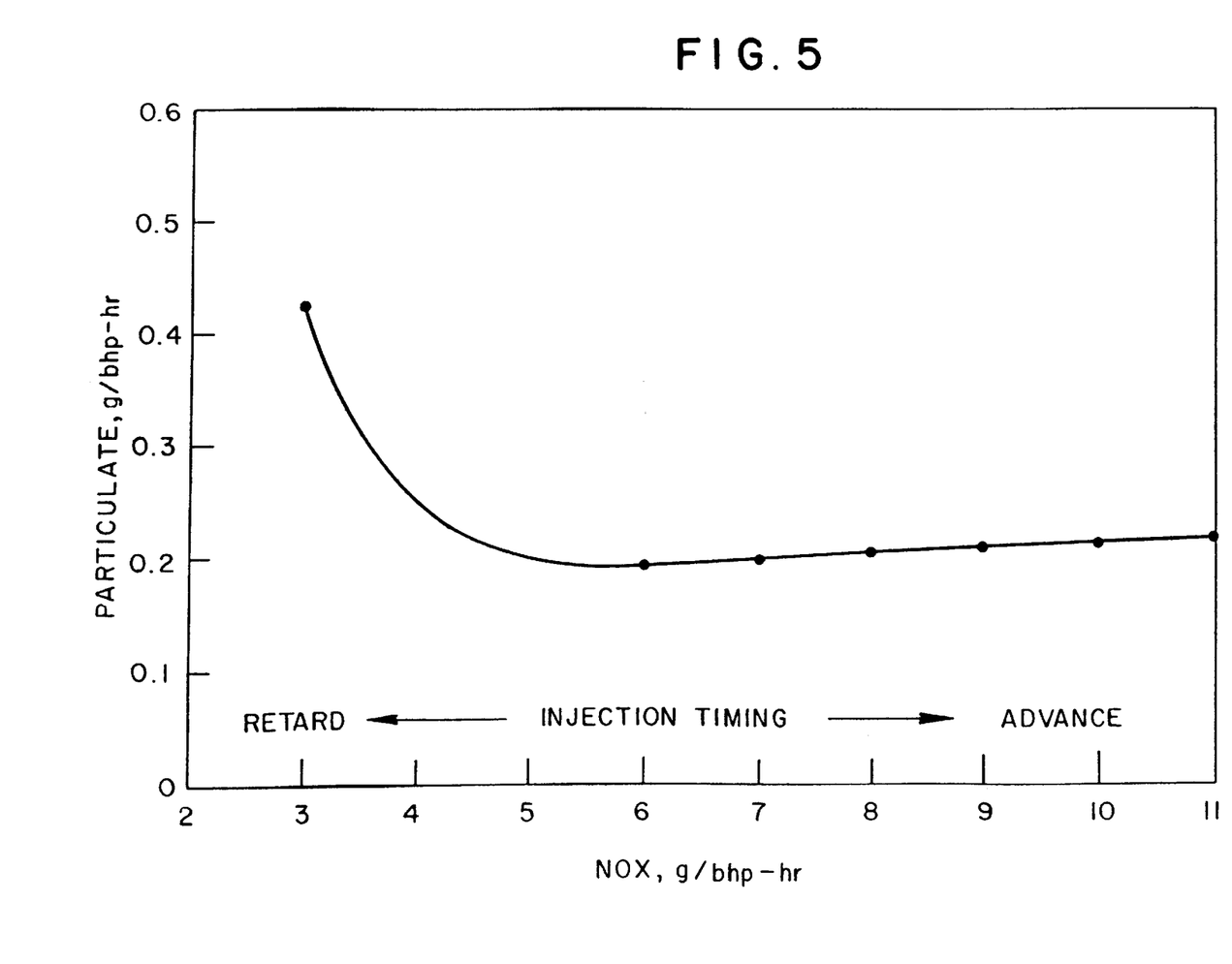
FIG. 5 is a graphical representation, showing for illustrative purposes the trade-off between particulates and nitrogen oxide emissions as a function of injection timing.

In accordance with one form of the method of the present invention, Modulator 40 is adjusted to strategically introduce the fuel according to the boost pressure in a manner to decrease the production of particulate matter while at the same time permitting NOx levels to increase while still remaining within acceptable levels. More particularly, where the conventional timing control means is typically set at approximately 1.475 inch, the timing control means of one form of the apparatus of the invention is adjusted to have a setting of approximately 1.420 inch. In the modified diesel engine component of the invention as described herein, this setting has the effect of increasing in the production of NOx which, as shown in FIG. 5, will cause a concomitant decrease in the production of particulate matter.

It is to be understood that the injection timing control means of the invention can alternatively comprise a throttle delay mechanism having a 0.454 inch setting as compared with the standard mechanism having 0.636 inch setting typically found in a conventional engine. This lower setting better controls the introduction of fuel into the combustion chamber in relation to the intake pressure of the modified diesel engine component of the invention to better achieve the desired results. The throttle control mechanism is also of a character well understood by those skilled in the art and can readily be modified in the manner just described by one skilled in the art.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. In a two-stroke, compression-ignited engine having a compression/combustion stroke, a cylinder defining a combustion chamber, a rotating crankshaft and an exhaust valve movable between an open and a closed position for exhausting exhaust gases from the combustion chamber, the improvement comprising a camshaft operably associated with said crankshaft and with said exhaust valve for controllably moving said exhaust valve between said open and closed position in a manner to allow a buildup of exhaust gases within the combustion chamber sufficient to absorb combustion heat to an extent necessary to adequately control peak combustion temperature to a temperature that will minimize the formation of nitrogen oxide so that following said combustion stroke the quantity of nitrogen oxide contained within the exhaust gases exhausted from the combustion cylinder will be less than 10.7 grams per brake horsepower-hour while at the same time the particulate matter contained within the exhaust gases will be less than about 0.14 grams per brake horsepower-hour.

2. In a two-stroke compression-ignited engine as defined in claim 1 in which the camshaft opens the exhaust valve by a lift amount of approximately 0.28 inches.

3. In a two-stroke, compression-ignited engine as defined in claim 2 in which the improvement further comprises providing a fuel injector for injecting fuel into the combustion chamber at a time which tends to result in the formation of nitrogen oxide within the combustion gases produced during the combustion stroke.

4. In a two-stroke, compression-ignited engine as defined in claim 3, the improvement further comprising injecting fuel into the combustion chamber at a time which tends to decrease the production of particulate matter within the combustion gases.

5. A method of operating a compression-ignited, two-stroke diesel engine of the type having a compression/combustion stroke and comprising a cylinder defining a combustion chamber, a rotating crankshaft, an exhaust valve that is opened and closed by a rotating camshaft operably associated with said crankshaft and fuel injection means for injecting fuel into said cylinder, said method comprising the steps of:

(a) during said compression combustion stroke, injecting fuel into said combustion chamber at a time which tends to result in the formation of nitrogen oxide within the combustion chamber as the fuel is combusted; and (b) opening and closing said exhaust valve in a manner to allow, after said combustion stroke, a buildup of exhaust gases within said cylinder in a quantity sufficient to absorb combustion heat to an extent to limit peak combustion temperature to a temperature that will limit the formation of nitrogen oxide to a degree that, following the combustion stroke, the exhaust gases formed will contain nitrogen oxide in an amount less than 10.7 grams per brake horsepower-hour and will contain particulate matter in an amount less than about 0.14 grams per brake horsepower-hour.

6. A method as defined in claim 5 including the step of injecting fuel into said combustion chamber at a time which tends to decrease the formation of particulate matter within the combustion chamber while at the same time tending to increase the formation of nitrogen oxide.

7. A method as defined in claim 6 including the step of opening the exhaust valve following the combustion stroke by a distance no greater than about 0.28 inches.

8. A method as defined in claim 7 including the step of limiting the time during which the exhaust valve is open so as to encourage the retention of exhaust gases within the combustion chamber to an extent sufficient to limit peak combustion temperature.

9. A method as defined in claim 7 including the step of providing oxygen to the combustion chamber during the compression/combustion stroke in an amount sufficient to accelerate the oxidation of the soluble organic fraction contained within said combustion chamber to an extent to produce exhaust temperatures sufficient to provide an oxidation rate of the soluble organic fraction which will tend to decrease particulate matter emissions.

10. A method of making an improved low emission mechanical power plant by modifying a baseline two-stroke diesel engine having a combustion chamber provided with an exhaust gas outlet port; a valve for opening and closing the exhaust outlet port; and a camshaft rotatable through an angle of 360 degrees for lifting the valve relative to the exhaust port by a lift amount of approximately 0.33 inches, said camshaft opening said exhaust valve at an angle of about 310 degrees, and closing said exhaust valve at an angle of about 55 degrees, the method comprising the steps of modifying the camshaft of the baseline two-stroke diesel engine component to cause the valve to open and close the exhaust outlet port in a manner to allow a buildup of exhaust gases within the combustion chamber sufficient to absorb combustion heat to an extent necessary to adequately control peak combustion temperature to a temperature that will minimize the formation of nitrogen oxide so that following said combustion stroke, the quantity of nitrogen oxide contained within the exhaust gases exhausted from the combustion cylinder will be less than 10.7 grams per brake horsepower-hour while at the same time, the particulate matter contained within the exhaust gases will be less than about 0.14 grams per brake horsepower-hour.

11. A method as defined in claim 10 in which the camshaft is modified to open the exhaust valve by a lift amount of approximately 0.28 inches.

12. A method as defined in claim 11 in which the camshaft is modified to open said exhaust valve at an angle about 330 degrees and to close said exhaust valve at an angle of about 35 degrees to thereby achieve the greater build-up in the volume of residual gases remaining in the combustion cylinder.

* * * * *